United States Patent
Li

(10) Patent No.: US 9,807,103 B2
(45) Date of Patent: Oct. 31, 2017

(54) DATA COMMUNICATION

(71) Applicant: Alibaba Group Holding Limited, Grand Cayman (KY)

(72) Inventor: Lizhong Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/724,632

(22) Filed: May 28, 2015

(65) Prior Publication Data

US 2015/0350224 A1 Dec. 3, 2015

(30) Foreign Application Priority Data

May 30, 2014 (CN) .......................... 2014 1 0239154

(51) Int. Cl.
  *G06F 15/16* (2006.01)
  *H04L 29/06* (2006.01)
  *G06Q 20/10* (2012.01)
  *G06Q 20/20* (2012.01)
  *G06F 21/43* (2013.01)
  *G06Q 20/38* (2012.01)
  *G06Q 20/42* (2012.01)

(52) U.S. Cl.
  CPC .............. *H04L 63/12* (2013.01); *G06F 21/43* (2013.01); *G06Q 20/1085* (2013.01); *G06Q 20/202* (2013.01); *G06Q 20/206* (2013.01); *G06Q 20/385* (2013.01); *G06Q 20/425* (2013.01); *H04L 63/083* (2013.01); *H04L 63/0838* (2013.01); *H04L 63/123* (2013.01); *H04L 67/42* (2013.01)

(58) Field of Classification Search
  CPC ....... H04L 63/12; H04L 63/083; H04L 67/42; G06F 21/43; G06Q 20/202
  USPC ......... 713/168–174, 182–186, 202; 709/206, 709/225, 229, 249, 389; 726/2–8
  See application file for complete search history.

(56) References Cited

U.S. PATENT DOCUMENTS

| 5,233,655 | A   | 8/1993 | Shapiro |              |
|-----------|-----|--------|---------|--------------|
| 2002/0059146 | A1* | 5/2002 | Keech   | G06Q 20/02 705/64 |
| 2005/0097050 | A1* | 5/2005 | Orcutt  | G06Q 20/042 705/45 |
| 2009/0031407 | A1  | 1/2009 | Kuang   |              |

(Continued)

OTHER PUBLICATIONS

PCT Search Report and Written Opinion mailed Sep. 3, 2015 for PCT Application No. PCT/US15/33034, 7 pages.

*Primary Examiner* — Evans Desrosiers
(74) *Attorney, Agent, or Firm* — Lee & Hayes, PLLC

(57) ABSTRACT

A client terminal sends a communication request to a server. The server generates at least one digit code according to a first preset rule. The server sends information including the at least one digit code to the client terminal. The client terminal generates at least one input box, a number of which corresponds to a number of the at least one digit code, detects an input event of the at least one input box, and obtains data of the at least input box when the input event occurs. The client terminal sends the data of the at least one input box as at least one verification data to the server. The server compares the digit data corresponding to the at least one digit code with the verification data and sends a successful information code to the client terminal when the two are the same. The techniques improve password security.

18 Claims, 8 Drawing Sheets

(56) References Cited

U.S. PATENT DOCUMENTS

2010/0088227 A1    4/2010   Belamant
2011/0113245 A1    5/2011   Varadarajan

* cited by examiner

DATA COMMUNICATION

CROSS REFERENCE TO RELATED PATENT APPLICATION

This application claims foreign priority to Chinese Patent Application No. 201410239154.6 filed on May 30, 2014, entitled "Data Communication Method and System, Client and Server," which is hereby incorporated by reference in its entirety.

TECHNICAL FIELD

The present disclosure relates to the technical field of data communication, and, more particularly, to a data communication method and system, client and server.

BACKGROUND

In real life, many scenarios require password verification to authenticate a user. For example, when the user logs into a website, makes a payment at a shopping mall, or withdraws cash at a bank or an automatic teller machine (ATM), the user needs to register at the website or open an account at a bank. When registering or opening the account, the user needs to set a user name and a password to facilitate shopping via an online bank or use a bank card to withdraw cash at the bank or the ATM.

Existing systems of the website or the bank require the user to input a complete account number and password and match the account number and password provided by the terminal with its stored account number and password. When the account number and password provided by the terminal match the stored account number and password, the existing systems determine that the current terminal successfully logs into the account and allows the current terminal to further visit data that is open to the user according to a privilege of the account. However, there are certain security risks of the existing systems. For example, when the account name of the website or the bank account number of the user is obtained by a hacker, the hacker may use password decryption software to continuously send a login request to a server of the website. Each login request may use a different password such that the password of the user is decrypted by traversing. As the current website does not require the password changes for each input, the existing password is easily decrypted. Once the password is decrypted, a pre-deposit amount of the user at the website may be appropriated or the account and password of the user at the online bank is leaked, thereby causing the hacker to transfer the user's asset.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a data communication method and system, client and server that reduce a risk that a password of the user is decrypted.

The present disclosure provides a data communication method. A client terminal sends a communication request to a server. The server responds to the communication request and generates at least one digit code according to a first preset rule. The server sends information including the at least one digit code to the client terminal. The client terminal generates at least one input box, a number of which corresponds to a number of the at least one digit code, detects an input event of the at least one input box, and obtains data of the at least input box when the input event occurs. The client terminal uses the data of the at least one input box as at least one verification data and sends it to the server. The server obtains at least one digit data corresponding to at least one digit code from preset data. The server compares the digit data corresponding to each digit code in the at least one digit code with the verification data. When the digit data corresponding to each digit code in the at least one digit code is the same as the verification data, the server sends a successful information code to the client terminal.

The present disclosure also provides a data communication system. The data communication system includes a client terminal and a server. The client terminal may include the following module. A request sending module sends a communication request to a server. A digit code receiving module receives information including at least one digit code from the server. An inputting module generates at least one input box, a number of which corresponds to a number of the at least one digit code, detects an input event of the at least one input box, and obtains data of the at least input box when the input event occurs. A verification data sending module uses the data of the at least one input box as at least one verification data and sends it to the server. The server may include the following modules. A request receiving module receives the communication request sent by the client terminal. A responding module responds to the communication request, generates at least one digit code according to a first preset rule, and sends information including the at least one digit code to the client terminal. A verification data receiving module receives the at least one verification data sent by the client terminal. A comparing module compares digit data in preset data corresponding to at least one digit code with the verification data, and, when the digit data corresponding to the at least one digit code is the same as the verification data, sends a successful information code to the client terminal.

The present disclosure also provides another data communication method. A communication request is sent to a server. Information sent by the server is received. The received information includes at least one digit code. At least one input box, a number of which corresponds to a number of the at least one digit code, is generated. An input event of the at least one input box is detected. When the input event occurs, data of the at least one input box is obtained. The data of the at least one input box is used as at least one verification data and sent to the server.

The present disclosure also provides a client terminal. The client terminal may include the following module. A request sending module sends a communication request to a server. A digit code receiving module receives information including at least one digit code from the server. An inputting module generates at least one input box, a number of which corresponds to a number of the at least one digit code, detects an input event of the at least one input box, and obtains data of the at least input box when the input event occurs. A verification data sending module uses the data of the at least one input box as at least one verification data and sends it to the server.

The present disclosure also provides another data communication method. A communication request sent by a client terminal is received. Responding to the communication request, at least one digit code is generated according to a first preset rule, and information including the at least one digit code is sent to the client terminal. At least one verification data sent by the client terminal is received. At least one digit data corresponding to the at least one digit code is obtained from preset data. The at least one digit data corresponding to the at least one digit code obtained from preset data is compared with the verification data. When the digit data corresponding to the at least one digit code is the same as the verification data, a successful information code is sent to the client terminal.

The present disclosure also provides a server. The server may include the following modules. A request receiving module receives a communication request sent by a client terminal. A responding module responds to the communication request, generates at least one digit code according to a first preset rule, and sends information including the at least one digit code to the client terminal. A verification data receiving module receives the at least one verification data sent by the client terminal. A comparing module compares digit data in preset data corresponding to at least one digit code with the verification data, and, when the digit data corresponding to the at least one digit code is the same as the verification data, sends a successful information code to the client terminal.

As shown from the above technical solutions provided by the present disclosure, the techniques of the present disclosure set one or more preset rules, requires the user to input data corresponding to one or more digit codes in preset data. Thus, the required input data changes when the user verifies identity each time. The techniques of the present disclosure thus ensure password security of the user and reduce the risk that the password is decrypted.

BRIEF DESCRIPTION OF THE DRAWINGS

To clearly illustrate the technical solutions of the existing techniques or techniques of the present disclosure, the drawings of the existing techniques or the example embodiments of the present disclosure are briefly describes. It is apparent that the FIGs below are some exam example embodiments of the present disclosure. One of ordinary skill in the art may obtain other figures based on FIGs without using creative efforts.

DETAILED DESCRIPTION

In order for one of ordinary sill in the art to understand the technical solutions of the present disclosure, the technical solutions of the present disclosure are described below by reference to the example embodiments and corresponding FIGs of the present disclosure. Obviously, the described embodiments represent merely part of the embodiments of the present disclosure and not all of the embodiments. All other embodiments obtained by one of ordinary skill in the art based on the embodiments of the present disclosure without using any creative effort shall belong to the protection scope of the present disclosure.

Figure 1:
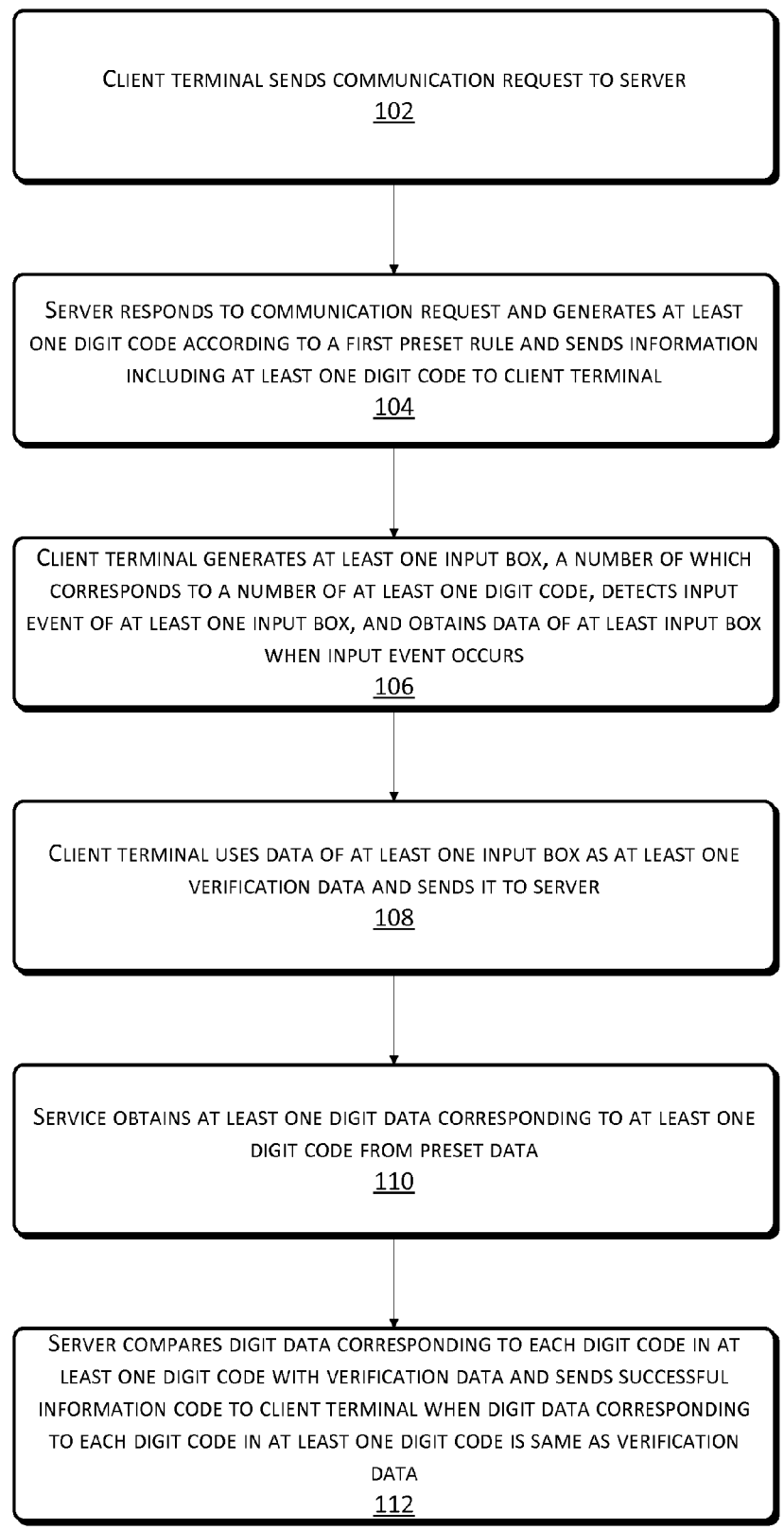
FIG. 1 is a flow chart illustrating an example data communication method according to an example embodiment of the present disclosure.

FIG. 1 is a flow chart illustrating an example data communication method according to an example embodiment of the present disclosure.

At 102, a client terminal sends a communication request to a server.

For example, the client terminal in the example embodiment may be a personal computer of a user, a point of sale (POS) machine or ATM of a merchant. Alternatively, the client terminal may be software executed on such hardware. The server may be a server of a website or a server of a merchant such as a bank.

When the client terminal sends the communication request to server, it is likely to indicate that a user logs into the server through the client terminal to view, edit, or use corresponding data stored at the server. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal requests to establish a communication with the server. Based on the communication, the client terminal may visit data stored on the server. There are quite a few events that trigger the communication request, such that the user clicks a login button when logging into the website or the user use the bank card to make payment via a POS machine.

At 104, the server responds to the communication request and generates at least one digit code according to a first preset rule. The server sends information including the at least one digit code to the client terminal.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively.

For example, the preset data may be pre-stored in the server to be used as encryption key when the client terminal establishes the communication with server. For instance, when the client terminal inputs the preset data which is same as those in the server, the client terminal establishes the communication with the server. The preset data may be a password preset by the user. The preset data may be stored corresponding to an account number or a user name of the user. When the user inputs the correct account number and the password or the user name and password, the user has access to data stored at the server. For example, the preset data may be a password for the user to log into the website. The user inputs the user name and the password at a login interface of the website to log into the website to conduct further operations. The preset data may be the password of the bank account of the user. The user uses the account number and the password or the account name and the password to conduct business at the bank or the ATM. For example, a number of digits of the preset data may be preset at a fixed number.

For example, the first preset rule is used to generate at least one digit code. A number of the at least one digit code and a value of such number are less than or equal to that of the preset data. The first preset rule generates a number of digits whose quantity or value of such quantity are less than or equal to that of the preset data. For example, a number of digit codes of the preset data is 6. The preset rule is to randomly pick two numbers between 1 and 6 each time and such selected two numbers are used as the digit codes. Certainly, when the communication request is received, the number of the generated at least one digit code may be not limited to two, which may be 1, 3, 4, 5, or 6, as long as the number of the at least one digit code is less than that of the digit codes of the preset data.

At 106, the client terminal generates at least one input box, a number of which corresponds to a number of the at least one digit code, detects an input event of the at least one input box, and obtains data of the at least input box when the input event occurs.

For example, the at least one input box is presented at a user interface of the client terminal to receive input from the user.

For example, after the client terminal receives the at least one digit code, the client terminal generates at least input box. When the user inputs data into the input box, the input event occurs. When the client terminal detects the input event, the client terminal obtains the data in the input box. The input box may be a control at the client terminal.

For example, the client terminal provides a prompt message to the user. For instance, the client terminal reminds the user by indicating a corresponding digit code of a respective input box near each input box. When the user knows the preset data, the user inputs the digit codes corresponding to data in the preset data according to the prompt message. The client terminal, after detecting that each of the at least one input box has the input event, obtains the data in the input box. Alternatively, the client terminal obtains data of the respective input box when detecting that the respective input box has the input event.

At 108, the client terminal uses the data of the at least one input box as at least one verification data and sends it to the server.

For example, the client terminal may, after detecting all of the input boxes have the input events, send the data in all of the input boxes to the server. Alternatively, the client terminal may set up a button and send the data to the server when the button is triggered.

For example, the client terminal obtains the data in the input box as the verification data. The verification data is used to determine whether the current user that inputs the data has a privilege to visit data stored in the server through the client terminal. As the client terminal generates at least one input box corresponding to the at least one code, each digit in the at least one verification data corresponds to a digit in the at least one digit code.

At 110, the server obtains at least one digit data corresponding to at least one digit code from the preset data.

For example, the server reads the digit data corresponding to the digit code according to the at least one digit code. For instance, if the preset data is 754962, the ranking order of the digit codes is from left to right, the at least one digit code includes 1 and 4. The digit code 1 corresponding the digit data 7, and the digit code 4 corresponds to the digit number 9.

At 112, the server compares the digit data corresponding to each digit code in the at least one digit code with the verification data. When the digit data corresponding to each digit code in the at least one digit code is the same as the verification data, the server sends a successful information code to the client terminal.

For example, the server compares the digit data corresponding to each digit code with the verification data. When the verification data is the same as the digit data, it indicates that the current user has an authorization to pass identity verification or is authorized to log in. When part or all of the verification data is not the same as the digit data, it indicates that there is error when verifying data, which also indicates that the current user does not have the authorization to pass identity verification, is not authorized to log in, or is not authorized to visit data stored at the server.

For example, the successful information code may be a character or a string of characters which represents that the digit data corresponding to the entire digit codes are the same as the verification data. The client terminal is authorized to further access the data stored at the server. For example, after the user logs into the website through the computer and the computer receives the successful information code from the server, the server prompts a successful log-in message. The user then uses the computer to access the data within the authorization. For another example, when the user logs into the online bank and the client terminal receives the successful information code, the user further conducts payment operation. For another example, when the user tries to withdraw cash from ATM, after the ATM receives the successful information code, the user withdraws cash or conducts other operations through the ATM.

The data communication method between the client terminal and the server provided by the present disclosure generates digit codes according to a preset rule. Thus, when the user logs into the server through the client terminal, the user needs to input the digit data corresponding to the digit codes in the password. During an interaction process between the client terminal and the server, the content required to be input by the client terminal may be different each time, thereby increasing the difficulty to decrypt the password and reduce the risk of password decryption.

In an example embodiment, at 104, a number of the at least one digit code and a value of such number are less than the digit codes of the preset data.

For example, the first preset rule sets the number of the digit codes of the preset data as an up limit number of the digit codes or value of the number of the digit codes. That is, the number of the digit codes and the value of such number are less than the number of the digit codes of the present data. The first preset rule may include a random function that generates a number or value that is less than the number or value of the number of the digit codes of the digit data. For example, if the digit codes of the present data are 6, the first preset rule randomly selects one number between 1 and 6. The number of selected numbers may be 1, 2, 3, 4, or 5. According to the data communication method provided by the present disclosure, during the interaction process between the client terminal and the server, a complete password does not appear. When the user mistakenly visits a phishing website or the client terminal is infected by Trojan horse, the hacker still cannot obtain the complete password, thereby avoiding leakage of the complete password.

In an example embodiment, at 102, the communication request may include account information. At 104, the number of the digit codes and the value of such number are less than the number of the digit codes of the present data corresponding to the account information.

For example, the account information may include either an account name or an account number. The preset data are stored corresponding to the account information at the server. For instance, the user has an account name "taobaoyonghu" at a website. When the user logs into the website, the user inputs the account name and submits it to the server. After receiving the communication request, the server obtains the number of the digit codes of the preset data corresponding to the account name "taobaoyonghu," generate at least one digit code, and conduct the following operations.

Figure 2:
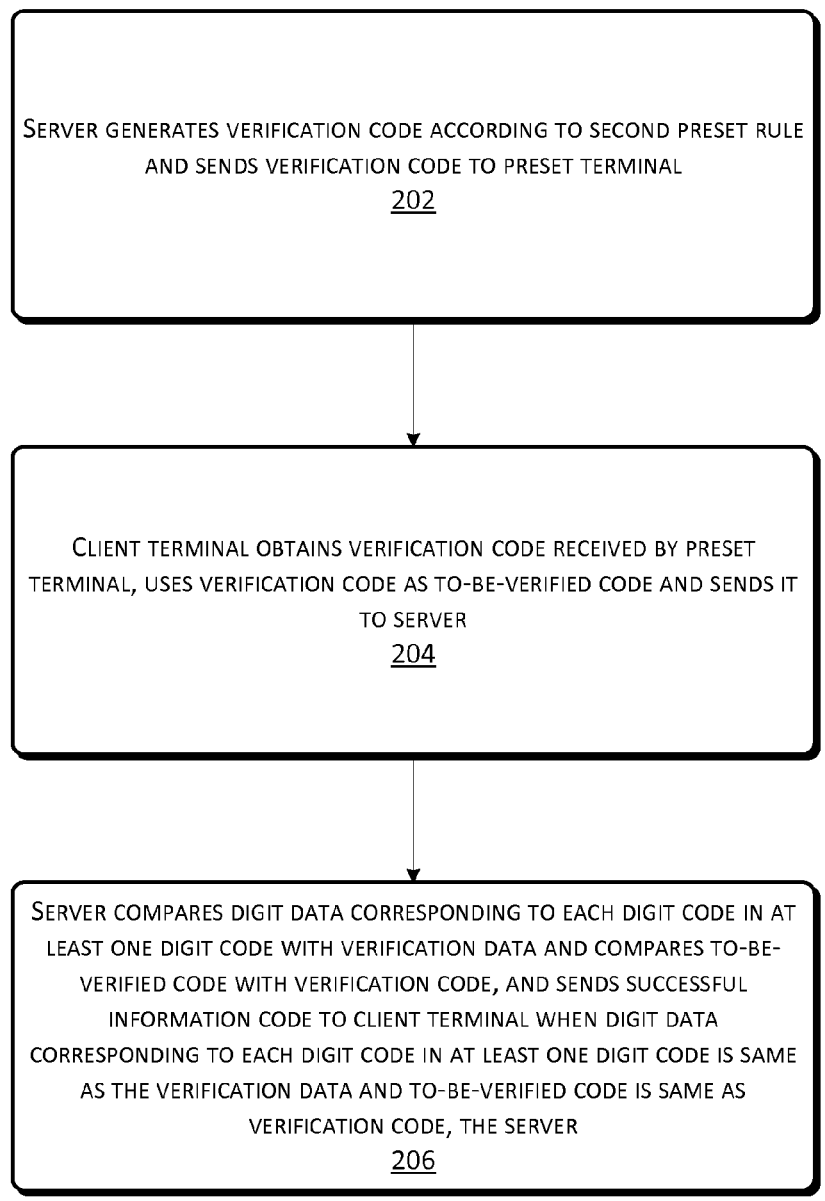
FIG. 2 is a flow chart illustrating another example data communication method according to an example embodiment of the present disclosure.

Referring to FIG. 2, in an example embodiment, the data communication method in FIG. 1 may also include the following sub-operations.

At 202, the server generates a verification code according to a second preset rule and sends the verification code to a preset terminal.

For example, the second preset rule is used to generate the verification code. The second preset rule may include a random function that generates a random number. The random number generated by the random function is the verification code. The second preset rule may be a two-dimensional code generator that generates a two-dimensional code, such as a dynamic two-dimensional code generator. The two-dimensional code or the dynamic two-dimensional code is the verification code. The two-dimensional code or the dynamic two-dimensional code generated by the second preset rule may be different teach time. The second preset rule may also be a barcode generate that generates a barcode. The barcode may be the verification code. The barcode generated by the second preset rule is different each time.

For example, the preset terminal may be a mobile phone of the user. The user may pre-store the mobile phone number in the server. The server sends the verification code to the mobile phone via short message service (SMS) text message. Certainly, the preset terminal may also be software that is installed on a device used by the user, which receives the verification code sent by the server via the device.

At 204, the client terminal obtains the verification code received by the preset terminal, uses the verification code as a to-be-verified code, and sends the to-be-verified code to the server.

For example, the client terminal may be equipped with a scanning apparatus that scans the verification code from the preset terminal. Alternatively, an input box is provided by the client terminal for the user to input the verification code received by the preset terminal. For instance, the client terminal is equipped with the scanning apparatus. The client terminal scans the preset terminal that displays the two-dimensional code, the dynamic two-dimensional code, or the barcode to obtain the two-dimensional code, the dynamic two-dimensional code, or the barcode. In other words, the client terminal obtains the verification code. Certainly, if the verification code is a random number, the client terminal may set up an input box to receive the random number input by the user so that the client terminal obtains the verification code. In addition, the preset terminal and the client terminal may communicate. For instance, the bluetooth or infrared techniques may be used for the client terminal to obtain the verification code from the preset terminal.

At 206, which is a sub-operation of 112, the server compares the digit data corresponding to each digit code in the at least one digit code with the verification data and compare the to-be-verified code with the verification code. When the digit data corresponding to each digit code in the at least one digit code is the same as the verification data, and the to-be-verified code is the same as the verification code, the server sends a successful information code to the client terminal.

In this example embodiment, the server may compare the digit data corresponding to each digit code in the at least one digit code with the verification data and compare the to-be-verified code with the verification code. When the digit data corresponding to each digit code in the at least one digit code is the same as the verification data, and the to-be-verified code is the same as the verification code, the server sends a successful information code to the client terminal.

In this example embodiment, the data communication method between the client terminal and the server, in addition to verifying based on the random digit codes corresponding to the preset data, adds a verification of the one-time effective verification code, thereby increasing security of interaction between the client terminal and the server. Thus, the techniques of the present disclosure improve security of the user account and the user password, effectively avoid leakage of the user password, prevent the hacker from illegally entering into the user account, and avoid damages to the user when the hacker uses the identity of the user to log into the server.

In an example embodiment, the first preset rule includes setting at least one code in the preset data as a reserved code. The at least one digit code generated by the first preset rule does not include the digit code of the reserved code.

In an example embodiment, a number of reserved codes is less than that of the preset data so that the code of the reserved code in the present data will not appear in the at least one digit code provided to the client terminal. Thus, the techniques of the present disclosure implement that the hacker cannot obtain the complete preset data even though the account and verification data input by the user are hacked multiple times during the interactive process between the client terminal and the server.

For example, the preset data is 754962 and the ranking order of the digit codes is from left to right, the digit codes of the reserved codes are "5" corresponding to the number 6 and "6" corresponding to the number 2. When the first preset rule generates the at least one digit code, the digit codes "5" and "6" will not appear. Thus, during the process of establishing the communication between the client terminal and the server, the number 6 and 2 in the preset data will not be input. Thus, even though the Trojan horse or phishing website obtains the data during the communication between the client terminal and the server multiple times, the hacker cannot obtain the data of the $5^{th}$ digit code and the $6^{th}$ digit code. The preset data may be as the password. The data communication method provided by the present disclosure effectively increase password security.

Figure 3:
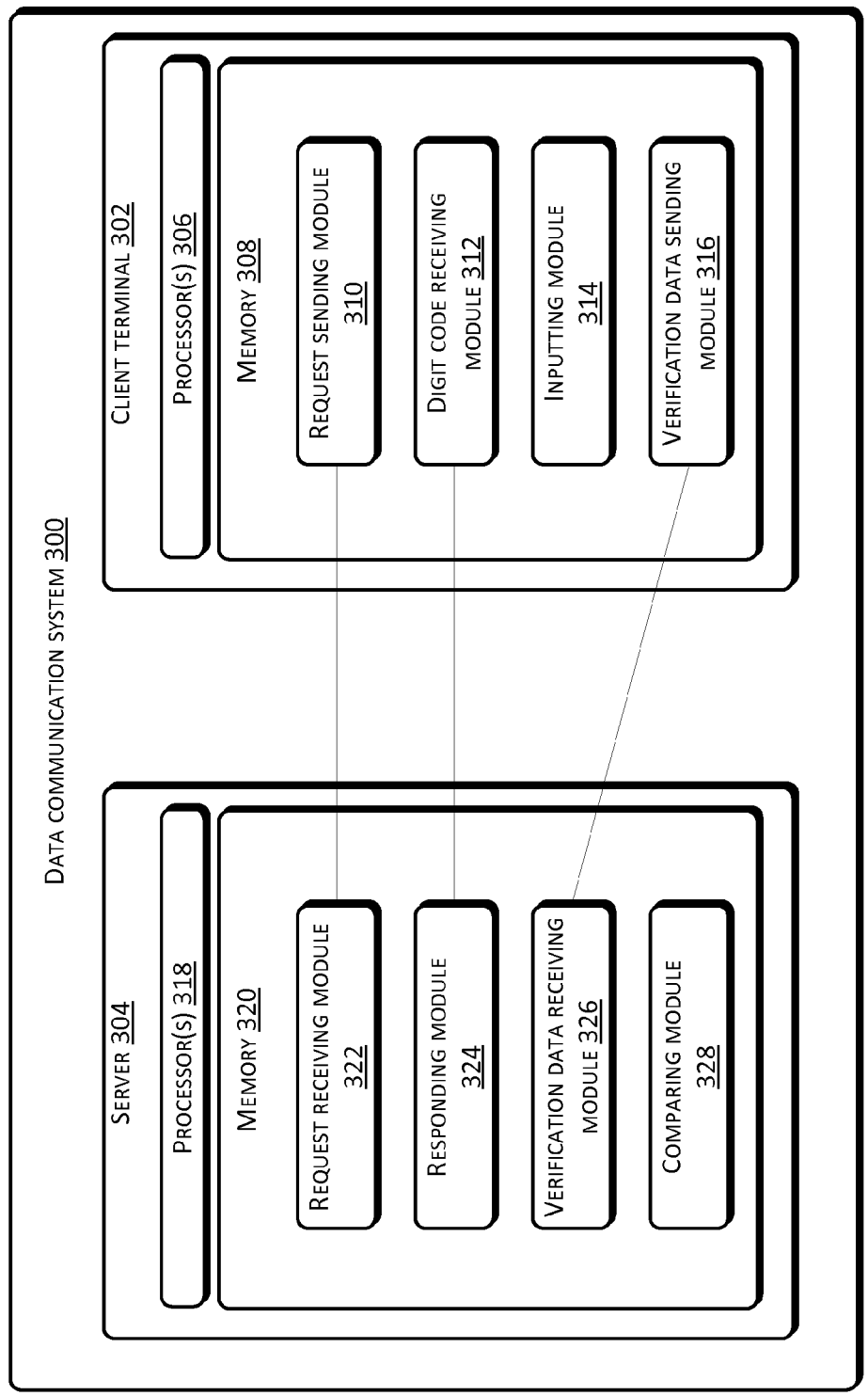
FIG. 3 is a diagram illustrating an example data communication system according to an example embodiment of the present disclosure.

Referring to FIG. 3, the present disclosure also provides an example data communication system 300, which includes a client terminal 302 and a server 304. The client terminal 302 may be a personal computer of a user, a point of sale (POS) machine or ATM of a merchant. Alternatively, the client terminal 302 may be software executed on such hardware. The server 304 may be a server of a website or a server of a merchant such as a bank.

For example, the client terminal 302 may include one or more processor(s) or data processing unit(s) 306 and memory 308. The client terminal 302 may further include one or more input/output devices and network interfaces (not shown in FIG. 3). The memory 304 is an example of computer readable media.

Computer readable media include permanent, nonpermanent, mobile and immobile media, which may implement information storage through any method or technologies. The information may be computer-readable or computer-executable instructions, data structures, program modules or other data. Examples of computer readable media include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other internal memory technologies, Compact Disk Read-Only Memories (CD-ROMs), Digital Versatile Discs (DVDs) or other optical memories, cassettes, cassette and disk memories or other magnetic memory devices or any other non-transmission media, which may be used for storing information which may be accessed by the computation device. According to the definitions herein, the computer readable media does not include transitory media such as a modulated data signal and a carrier wave.

The memory 308 may store therein a plurality of modules or units including a request sending module 310, a digit code receiving module 312, an inputting module 314, and a verification data sending module 316.

The request sending module 310 sends a communication request to the server 304.

In the example embodiment, when the request sending module 310 sends the communication request to the server 304, it indicate that a user logs into the server 304 through the client terminal 302 to view, edit, or use corresponding data stored at the server 304. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal 302 requests to establish a communication with the server 304. Based on the communication, the client terminal 302 may visit data stored on the server 304.

The digit code receiving module 312 receives information including at least one digit code from the server 304.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively. The preset data may be a password preset by the user.

The inputting module 314 generates at least one input box, a number of which corresponds to a number of the at least one digit code, detects an input event of the at least one input box, and obtains data of the at least input box when the input event occurs.

For example, after the client terminal 302 receives the at least one digit code, the inputting module 314 generates at least input box. When the user inputs data into the input box, the input event occurs. When the inputting module 314 detects the input event, the inputting module 314 obtains the data in the input box. The input box may be a control at the client terminal 302.

For example, the inputting module 314 may provide a prompt message to the user. For instance, the inputting module 314 reminds the user by indicating a corresponding digit code of a respective input box near each input box. When the user knows the preset data, the user inputs the digit codes corresponding to data in the preset data according to the prompt message. The inputting module 314, after detecting that each of the at least one input box has the input event, obtains the data in the input box. Alternatively, the inputting module 314 obtains data of the respective input box when detecting that the respective input box has the input event.

The verification data sending module 316 uses the data of the at least one input box as at least one verification data and sends it to the server.

For example, the verification data sending module 316 may, after detecting all of the input boxes have the input events, send the data in all of the input boxes to the server 304. Alternatively, the verification data sending module 316 may set up a button and send the data to the server 304 when the button is triggered.

For example, the verification data sending module 316 obtains the data in the input box as the verification data. The verification date is for the server 304 to determine whether the current user that inputs the data has a privilege to visit data stored in the server 304 through the client terminal 302. As the inputting module 314 generates at least one input box corresponding to the at least one code, each digit in the at least one verification data corresponds to a digit in the at least one digit code.

The server 304 may include one or more processor(s) or data processing unit(s) 318 and memory 320. The server 304 may further include one or more input/output devices and network interfaces (not shown in FIG. 3). The memory 320 is an example of computer readable media.

The memory 320 may store therein a plurality of modules or units including a request receiving module 322, a responding module 324, a verification data receiving module 326, and a comparing module 328.

The request receiving module 322 receives the communication request sent by the client terminal 302.

In the example embodiment, when the client terminal 302 sends the communication request to the server 304, it indicate that a user logs into the server 304 through the client terminal 302 to view, edit, or use corresponding data stored at the server 304. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal 302 requests to establish a communication with the server 304. Based on the communication, the client terminal 302 may visit data stored on the server 304.

The responding module 324 responds to the communication request, generates at least one digit code according to a first preset rule, and sends information including the at least one digit code to the client terminal.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively.

For example, the preset data may be pre-stored in the server 304 to be used as encryption key when the client terminal 302 establishes the communication with server 304. For instance, when the client terminal 302 inputs the preset data which is same as those in the server, the client terminal 302 establishes the communication with the server 304. The preset data may be a password preset by the user. The preset data may be stored corresponding to an account number or a user name of the user. When the user inputs the correct account number and the password or the user name and password, the user has access to data stored at the server 304. For example, the preset data may be a password for the user to log into the website. The user inputs the user name and the password at a login interface of the website to log into the website to conduct further operations. The preset data may be the password of the bank account of the user. The user uses the account number and the password or the account name and the password to conduct business at the bank or the ATM. For example, a number of digits of the preset data may be preset at a fixed number.

For example, the first preset rule is used to generate at least one digit code. A number of the at least one digit code and a value of such number are less than or equal to that of the preset data. The first preset rule generates a number of digits whose quantity or value of such quantity are less than or equal to that of the preset data. For example, a number of digit codes of the preset data is 6. The preset rule is to randomly pick two numbers between 1 and 6 each time and such selected two numbers are used as the digit codes. Certainly, when the communication request is received, the number of the generated at least one digit code may be not limited to two, which may be 1, 3, 4, 5, or 6, as long as the number of the at least one digit code is less than that of the digit codes of the preset data.

The verification data receiving module 326 receives the at least one verification data sent by the client terminal 302.

In the example embodiment, the verification data is used to determine whether the client terminal 302 has the privilege to visit the data at the server 304.

The comparing module 328 compares digit data in preset data corresponding to at least one digit code with the verification data, and, when the digit data corresponding to the at least one digit code is the same as the verification data, sends a successful information code to the client terminal.

For example, the server 304 compares the digit data corresponding to each digit code with the verification data. When the verification data is the same as the digit data, it indicates that the current user has an authorization to pass identity verification or is authorized to log in. When part or all of the verification data is not the same as the digit data, it indicates that there is error when verifying data, which also indicates that the current user does not have the authorization to pass identity verification, is not authorized to log in, or is not authorized to visit data stored at the server.

For example, the successful information code may be a character or a string of characters which represents that the digit data corresponding to the entire digit codes are the same as the verification data. The client terminal is authorized to further access the data stored at the server. For example, after the user logs into the website through the computer and the computer receives the successful information code from the server, the server prompts a successful log-in message. The user then uses the computer to access the data within the authorization. For another example, when the user logs into the online bank and the client terminal receives the successful information code, the user further conducts payment operation. For another example, when the user tries to withdraw cash from ATM, after the ATM receives the successful information code, the user withdraws cash or conducts other operations through the ATM.

Figure 4:
FIG. 4 is a flow chart illustrating another example data communication method according to an example embodiment of the present disclosure.

Referring to FIG. 4, the present disclosure also provides another example data communication method, which may include the following operations.

At 402, a communication request is sent to a server.

In the example embodiment, when the client terminal sends the communication request to server, it is likely to indicate that a user logs into the server through the client terminal to view, edit, or use corresponding data stored at the server. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal requests to establish a communication with the server. Based on the communication, the client terminal may visit data stored on the server.

At 404, information sent by the server is received and at least one digit code included in the information is obtained.

At 406, at least one input box, a number of which corresponds to a number of the at least one digit code, is generated. An input event of the at least one input box is detected. When the input event occurs, data of the at least one input box is obtained.

For example, after the client terminal receives the at least one digit code, the client terminal generates at least input box. When the user inputs data into the input box, the input event occurs. When the client terminal detects the input event, the client terminal obtains the data in the input box. The input box may be a control at the client terminal.

For example, the client terminal provides a prompt message to the user. For instance, the client terminal reminds the user by indicating a corresponding digit code of a respective input box near each input box. When the user knows the preset data, the user inputs the digit codes corresponding to data in the preset data according to the prompt message. The client terminal, after detecting that each of the at least one input box has the input event, obtains the data in the input box. Alternatively, the client terminal obtains data of the respective input box when detecting that the respective input box has the input event.

At 408, the data of the at least one input box is used as at least one verification data and sent to the server.

For example, the client terminal may, after detecting all of the input boxes have the input events, send the data in all of the input boxes to the server. Alternatively, the client terminal may set up a button and send the data to the server when the button is triggered.

For example, the client terminal obtains the data in the input box as the verification data. The verification data is used to determine whether the current user that inputs the data has a privilege to visit data stored in the server through the client terminal. As the client terminal generates at least one input box corresponding to the at least one code, each digit in the at least one verification data corresponds to a digit in the at least one digit code.

In an example embodiment, the communication request includes account information. For instance, the account information may include either an account name or an account number. The preset data are stored corresponding to the account information at the server. For instance, the user has an account name "taobaoyonghu" at a website. When the user logs into the website, the user inputs the account name and submits it to the server. After receiving the communication request, the server obtains the number of the digit codes of the preset data corresponding to the account name "taobaoyonghu," generate at least one digit code, and conduct the following operations.

In an example embodiment, the data communication method may further include receiving a verification code from a preset terminal and sending the verification code as a to-be-verified code to the server.

For example, the client terminal may be equipped with a scanning apparatus that scans the verification code from the preset terminal. Alternatively, an input box is provided by the client terminal for the user to input the verification code received by the preset terminal. For instance, the client terminal is equipped with the scanning apparatus. The client terminal scans the preset terminal that displays the two-dimensional code, the dynamic two-dimensional code, or the barcode to obtain the two-dimensional code, the dynamic two-dimensional code, or the barcode. In other words, the client terminal obtains the verification code. Certainly, if the verification code is a random number, the client terminal may set up an input box to receive the random number input by the user so that the client terminal obtains the verification code. In addition, the preset terminal and the client terminal may communicate. For instance, the bluetooth or infrared techniques may be used for the client terminal to obtain the verification code from the preset terminal.

For example, the preset terminal may be a mobile phone of the user. The user may pre-store the mobile phone number in the server. The server sends the verification code to the mobile phone via short message service (SMS) text message. Certainly, the preset terminal may also be software that is installed on a device used by the user, which receives the verification code sent by the server via the device.

Figure 5:
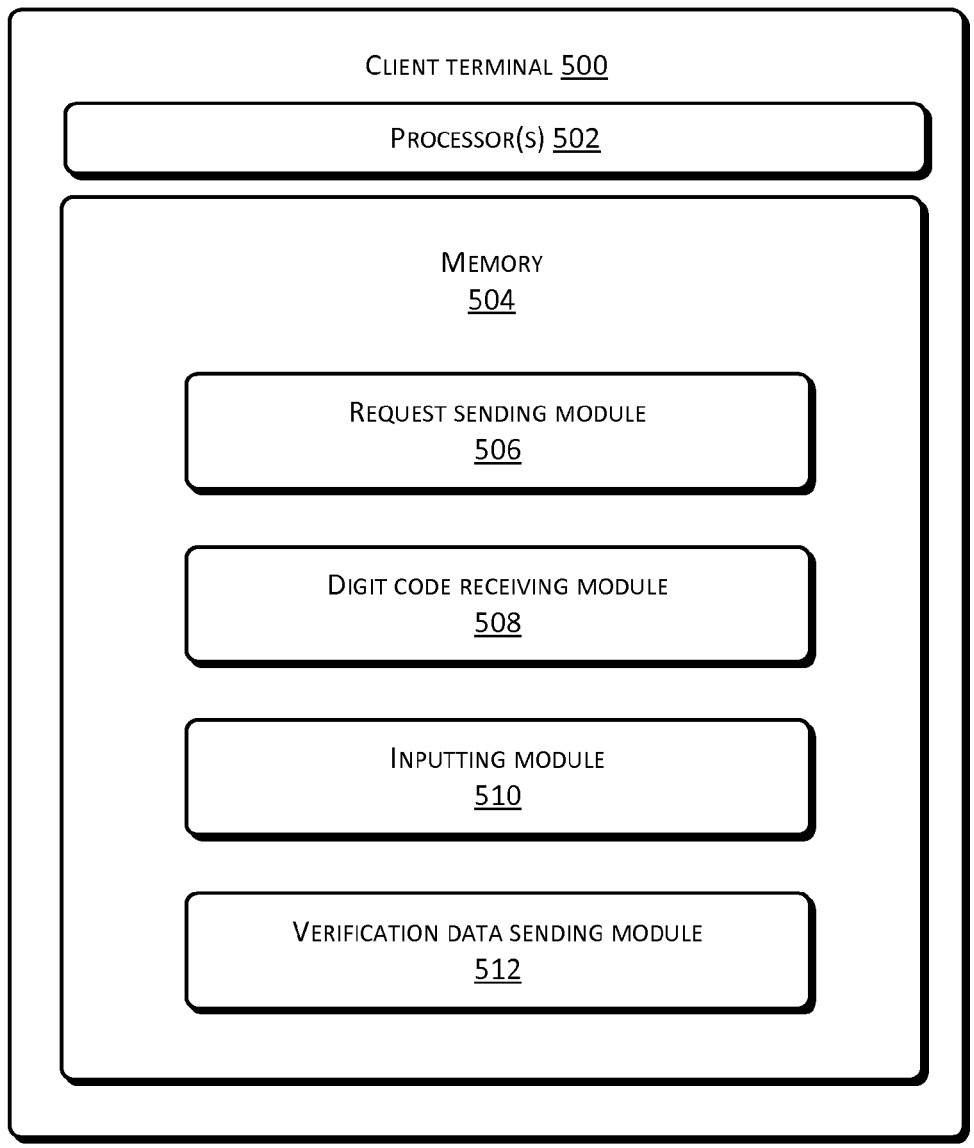
FIG. 5 is a diagram illustrating an example client terminal according to an example embodiment of the present disclosure.

Referring to FIG. 5, the present disclosure also provides an example client terminal 500. For example, the client terminal 500 may be a personal computer of a user, a point of sale (POS) machine or ATM of a merchant. Alternatively, the client terminal 500 may be software executed on such hardware.

The client terminal 500 may include one or more processor(s) or data processing unit(s) 502 and memory 504. The client terminal 500 may further include one or more input/output devices and network interfaces (not shown in FIG. 5). The memory 504 is an example of computer readable media.

The memory 504 may store therein a plurality of modules or units including a request sending module 506, a digit code receiving module 508, an inputting module 510, and a verification data sending module 512.

The request sending module 506 sends a communication request to a server.

In the example embodiment, when the request sending module 506 sends the communication request to the server, it indicate that a user logs into the server through the client terminal 500 to view, edit, or use corresponding data stored at the server. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal 500 requests to establish a communication with the server. Based on the communication, the client terminal 500 may visit data stored on the server.

The digit code receiving module 508 receives information including at least one digit code from the server.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively. The preset data may be a password preset by the user.

The inputting module 510 generates at least one input box, a number of which corresponds to a number of the at least one digit code, detects an input event of the at least one input box, and obtains data of the at least input box when the input event occurs.

For example, after the client terminal 500 receives the at least one digit code, the inputting module 510 generates at least input box. When the user inputs data into the input box, the input event occurs. When the inputting module 510 detects the input event, the inputting module 314 obtains the data in the input box. The input box may be a control at the client terminal 302.

For example, the inputting module 510 may provide a prompt message to the user. For instance, the inputting module 510 reminds the user by indicating a corresponding digit code of a respective input box near each input box. When the user knows the preset data, the user inputs the digit codes corresponding to data in the preset data according to the prompt message. The inputting module 510, after detecting that each of the at least one input box has the input event, obtains the data in the input box. Alternatively, the inputting module 314 obtains data of the respective input box when detecting that the respective input box has the input event.

The verification data sending module 512 uses the data of the at least one input box as at least one verification data and sends it to the server.

For example, the verification data sending module 512 may, after detecting all of the input boxes have the input events, send the data in all of the input boxes to the server. Alternatively, the verification data sending module 512 may set up a button and send the data to the server when the button is triggered.

For example, the verification data sending module 512 obtains the data in the input box as the verification data. The verification date is for the server to determine whether the current user that inputs the data has a privilege to visit data stored in the server through the client terminal 500. As the inputting module 510 generates at least one input box corresponding to the at least one code, each digit in the at least one verification data corresponds to a digit in the at least one digit code.

Figure 6:
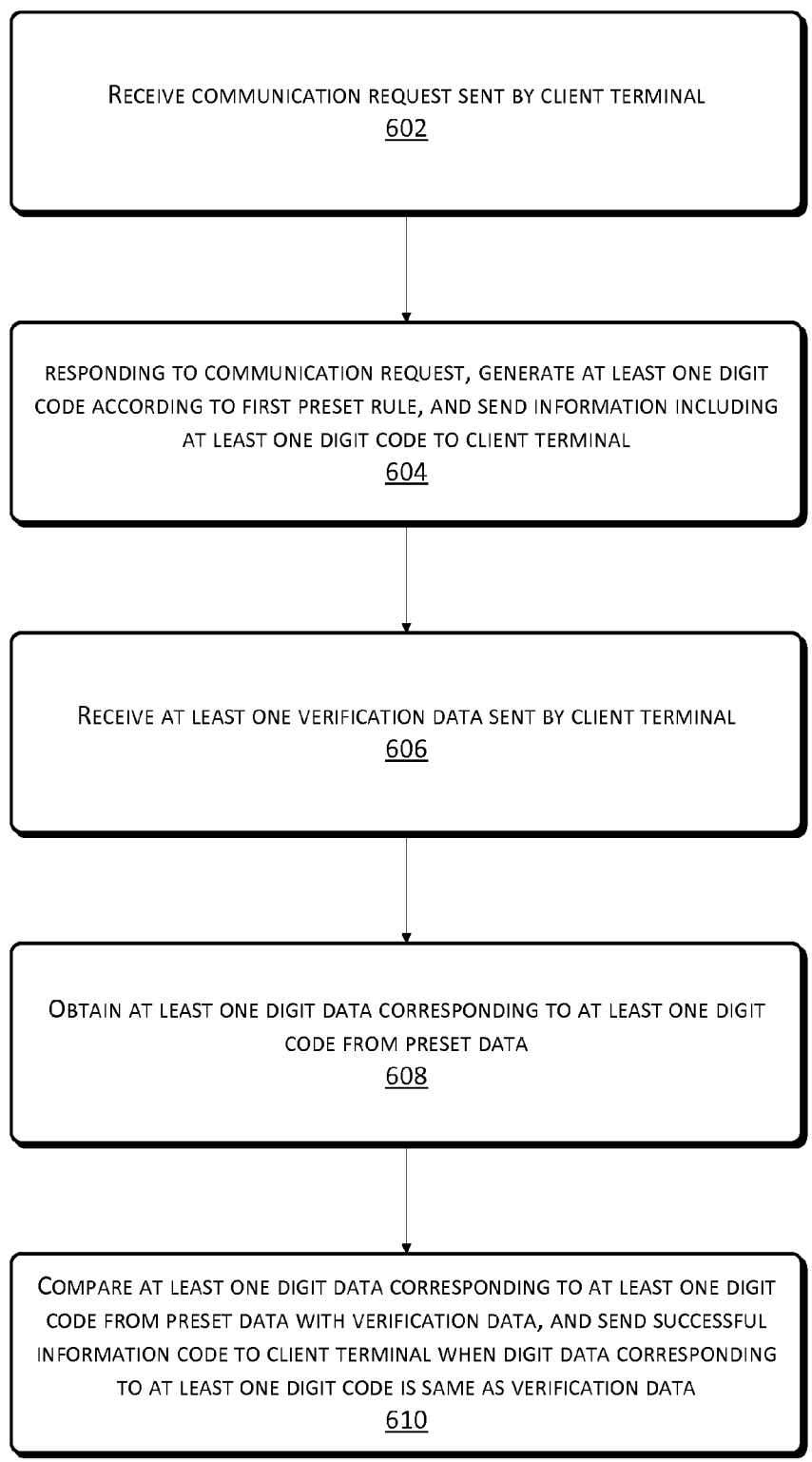
FIG. 6 is a flow chart illustrating another example data communication method according to an example embodiment of the present disclosure.

Referring to FIG. 6, the present disclosure also provides another data communication method, which includes the following operations.

At 602, a communication request sent by a client terminal is received.

In the example embodiment, when the client terminal sends the communication request to server, it is likely to indicate that a user logs into the server through the client terminal to view, edit, or use corresponding data stored at the server. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal requests to establish a communication with the server. Based on the communication, the client terminal may visit data stored on the server.

At 604, responding to the communication request, at least one digit code is generated according to a first preset rule, and information including the at least one digit code is sent to the client terminal.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively.

For example, the preset data may be pre-stored in the server to be used as encryption key when the client terminal establishes the communication with server. For instance, when the client terminal inputs the preset data which is same as those in the server, the client terminal establishes the communication with the server. The preset data may be a password preset by the user. The preset data may be stored corresponding to an account number or a user name of the user. When the user inputs the correct account number and the password or the user name and password, the user has access to data stored at the server. For example, the preset data may be a password for the user to log into the website. The user inputs the user name and the password at a login interface of the website to log into the website to conduct further operations. The preset data may be the password of the bank account of the user. The user uses the account number and the password or the account name and the password to conduct business at the bank or the ATM. For example, a number of digits of the preset data may be preset at a fixed number.

For example, the first preset rule is used to generate at least one digit code. A number of the at least one digit code and a value of such number are less than or equal to that of the preset data. The first preset rule generates a number of digits whose quantity or value of such quantity are less than or equal to that of the preset data. For example, a number of digit codes of the preset data is 6. The preset rule is to randomly pick two numbers between 1 and 6 each time and such selected two numbers are used as the digit codes. Certainly, when the communication request is received, the number of the generated at least one digit code may be not limited to two, which may be 1, 3, 4, 5, or 6, as long as the number of the at least one digit code is less than that of the digit codes of the preset data.

At 606, at least one verification data sent by the client terminal is received. In the example embodiment, the verification date is used to determine whether the client terminal has the privilege or authorization to visit data at the server.

At 608, at least one digit data corresponding to the at least one digit code is obtained from preset data.

For example, the serer reads the digit data according to the digit code from the preset data according to the at least one digit code. For example, if the preset data is 754962 and a ranking order of the digit codes are from left to right, the at least one digit code includes "1" and "4," the digit code "1" corresponds to the digit data 7 and the digit code "4" corresponds to the digit data "9."

At 610, the at least one digit data corresponding to the at least one digit code obtained from preset data is compared with the verification data. When the digit data corresponding to the at least one digit code is the same as the verification data, a successful information code is sent to the client terminal.

For example, the server compares the digit data corresponding to each digit code with the verification data. When the verification data is the same as the digit data, it indicates that the current user has an authorization to pass identity verification or is authorized to log in. When part or all of the verification data is not the same as the digit data, it indicates that there is error when verifying data, which also indicates that the current user does not have the authorization to pass identity verification, is not authorized to log in, or is not authorized to visit data stored at the server.

For example, the successful information code may be a character or a string of characters which represents that the digit data corresponding to the entire digit codes are the same as the verification data. The client terminal is authorized to further access the data stored at the server. For example, after the user logs into the website through the computer and the computer receives the successful information code from the server, the server prompts a successful log-in message. The user then uses the computer to access the data within the authorization. For another example, when the user logs into the online bank and the client terminal receives the successful information code, the user further conducts payment operation. For another example, when the user tries to withdraw cash from ATM, after the ATM receives the successful information code, the user withdraws cash or conducts other operations through the ATM.

In an example embodiment, at 604, a number of the at least one digit code and a value of such number are less than the digit codes of the preset data.

For example, the first preset rule sets the number of the digit codes of the preset data as an up limit number of the digit codes or value of the number of the digit codes. That is, the number of the digit codes and the value of such number are less than the number of the digit codes of the present data. The first preset rule may include a random function that generates a number or value that is less than the number or value of the number of the digit codes of the digit data. For example, if the digit codes of the present data are 6, the first preset rule randomly selects one number between 1 and 6. The number of selected numbers may be 1, 2, 3, 4, or 5. According to the data communication method provided by the present disclosure, during the interaction process between the client terminal and the server, a complete password does not appear. When the user mistakenly visits a phishing website or the client terminal is infected by Trojan horse, the hacker still cannot obtain the complete password, thereby avoiding leakage of the complete password.

In an example embodiment, the communication request may include account information. At 604, the number of the digit codes and the value of such number are less than the number of the digit codes of the present data corresponding to the account information.

For example, the account information may include either an account name or an account number. The preset data are stored corresponding to the account information at the server. For instance, the user has an account name "taobaoyonghu" at a website. When the user logs into the website, the user inputs the account name and submits it to the server. After receiving the communication request, the server obtains the number of the digit codes of the preset data corresponding to the account name "taobaoyonghu," generate at least one digit code, and conduct the following operations.

Figure 7:
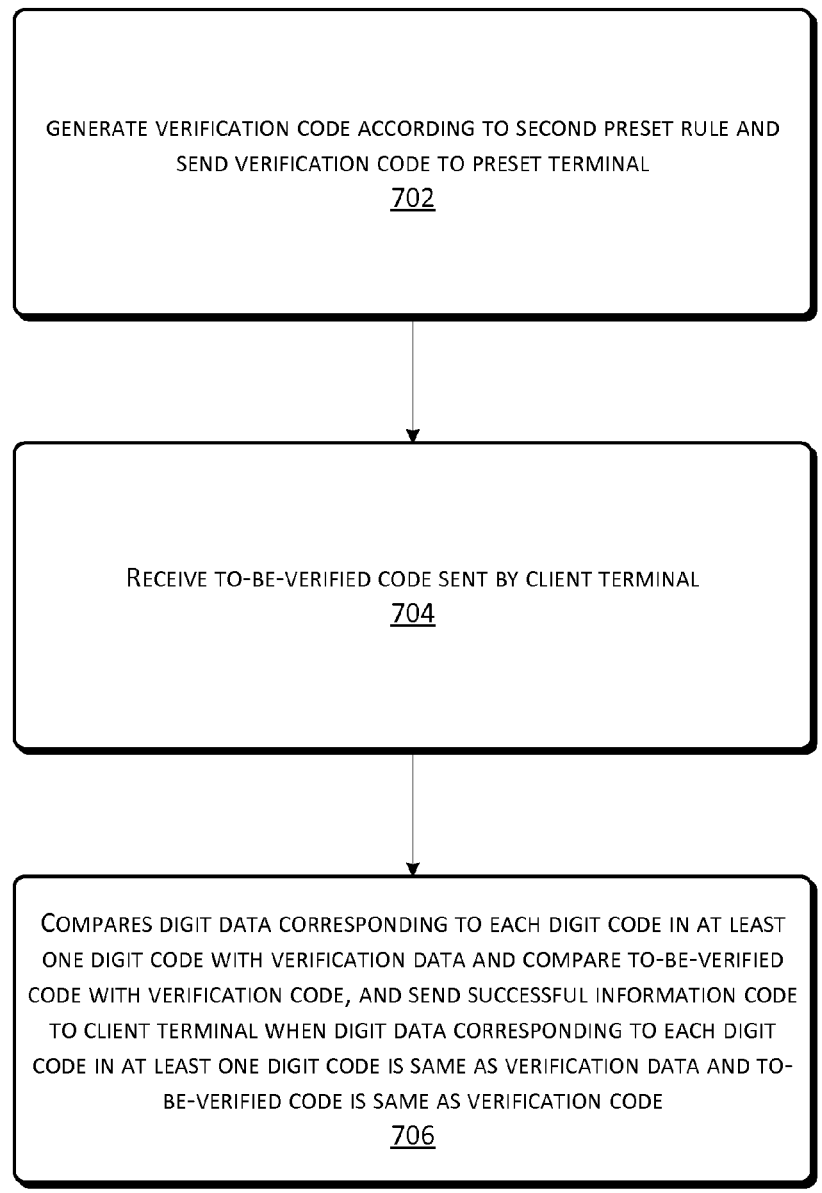
FIG. 7 is a flow chart illustrating another example data communication method according to an example embodiment of the present disclosure.

Referring to FIG. 7, in an example embodiment of the present disclosure, the data communication method may further include the following operations.

At 702, a verification code is generated according to a second preset rule and the verification is sent to a preset terminal.

For example, the second preset rule is used to generate the verification code. The second preset rule may include a random function that generates a random number. The random number generated by the random function is the verification code. The second preset rule may be a two-dimensional code generator that generates a two-dimensional code, such as a dynamic two-dimensional code generator. The two-dimensional code or the dynamic two-dimensional code is the verification code. The two-dimensional code or the dynamic two-dimensional code generated by the second preset rule may be different teach time. The second preset rule may also be a barcode generate that generates a barcode. The barcode may be the verification code. The barcode generated by the second preset rule is different each time.

For example, the preset terminal may be a mobile phone of the user. The user may pre-store the mobile phone number in the server. The server sends the verification code to the mobile phone via short message service (SMS) text message. Certainly, the preset terminal may also be software that is installed on a device used by the user, which receives the verification code sent by the server via the device.

At 704, to-be-verified code sent by the client terminal is received. In the example embodiment, the to-be-verified code is the verification code received by the preset terminal and obtained by the client terminal from the preset terminal.

At 706, which is a sub-operation of 610, the digit data corresponding to each digit code in the at least one digit code is compared with the verification data and the to-be-verified code is compared with the verification code. When the digit data corresponding to each digit code in the at least one digit code is the same as the verification data, and the to-be-verified code is the same as the verification code, a successful information code is sent to the client terminal.

In this example embodiment, the server may compare the digit data corresponding to each digit code in the at least one digit code with the verification data and compare the to-be-verified code with the verification code. When the digit data corresponding to each digit code in the at least one digit code is the same as the verification data, and the to-be-verified code is the same as the verification code, the server sends a successful information code to the client terminal.

In this example embodiment, the data communication method between the client terminal and the server, in addition to verifying based on the random digit codes corresponding to the preset data, adds a verification of the one-time effective verification code, thereby increasing security of interaction between the client terminal and the server. Thus, the techniques of the present disclosure improve security of the user account and the user password, effectively avoid leakage of the user password, prevent the hacker from illegally entering into the user account, and avoid damages to the user when the hacker uses the identity of the user to log into the server.

In an example embodiment, the first preset rule includes setting at least one code in the preset data as a reserved code. The at least one digit code generated by the first preset rule does not include the digit code of the reserved code.

In an example embodiment, a number of reserved codes is less than that of the preset data so that the code of the reserved code in the present data will not appear in the at least one digit code provided to the client terminal. Thus, the techniques of the present disclosure implement that the hacker cannot obtain the complete preset data even though the account and verification data input by the user are hacked multiple times during the interactive process between the client terminal and the server.

For example, the preset data is 754962 and the ranking order of the digit codes is from left to right, the digit codes of the reserved codes are "5" corresponding to the number 6 and "6" corresponding to the number 2. When the first preset rule generates the at least one digit code, the digit codes "5" and "6" will not appear. Thus, during the process of establishing the communication between the client terminal and the server, the number 6 and 2 in the preset data will not be input. Thus, even though the Trojan horse or phishing website obtains the data during the communication between the client terminal and the server multiple times, the hacker cannot obtain the data of the $5^{th}$ digit code and the $6^{th}$ digit code. The preset data may be as the password. The data communication method provided by the present disclosure effectively increase password security.

Figure 8:
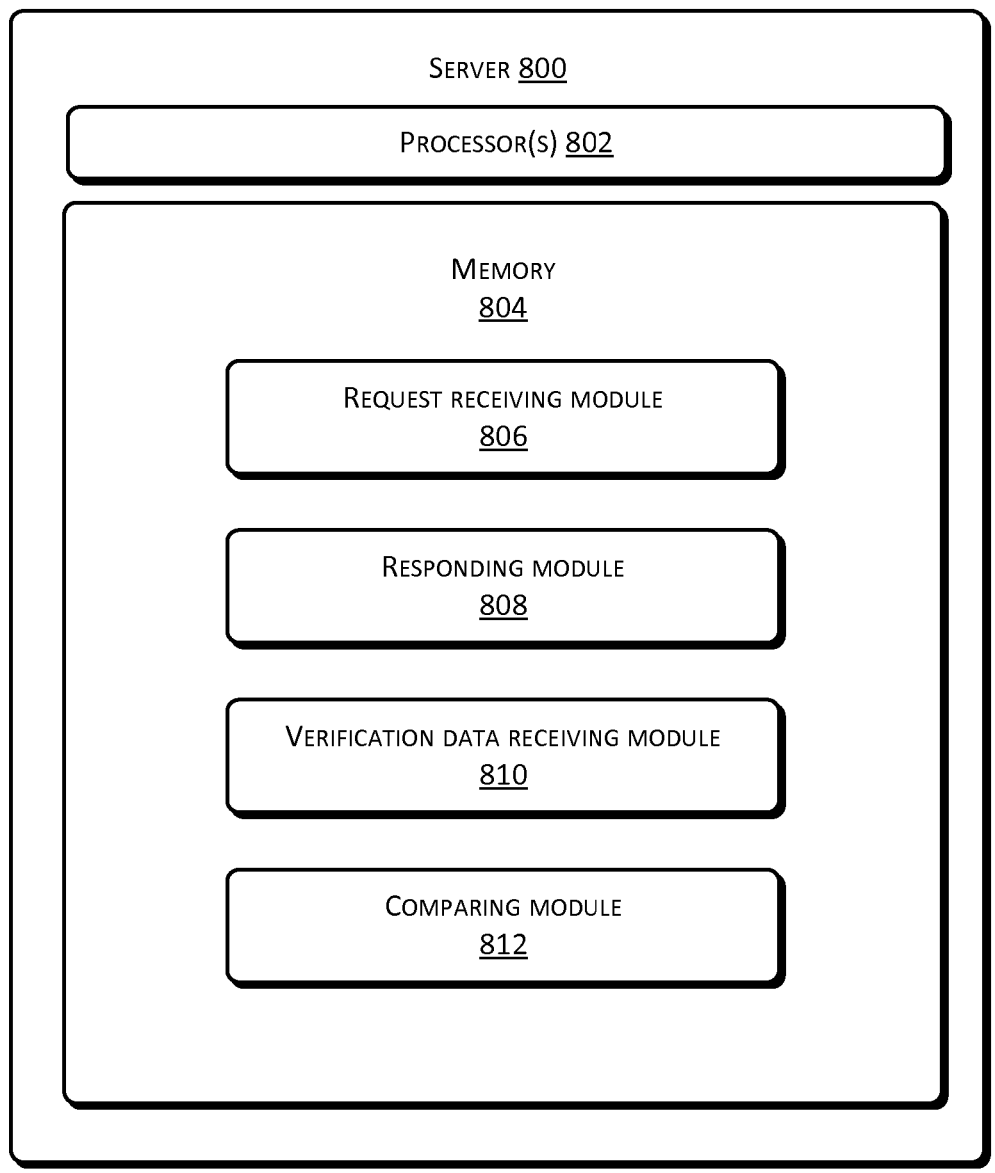
FIG. 8 is a diagram illustrating an example server according to an example embodiment of the present disclosure.

Referring to FIG. 8, the present disclosure also provides an example server 800. The server 800 may include one or more processor(s) or data processing unit(s) 802 and memory 804. The server 800 may further include one or more input/output devices and network interfaces (not shown in FIG. 8). The memory 804 is an example of computer readable media.

The memory 804 may store therein a plurality of modules or units including a request receiving module 806, a responding module 808, a verification data receiving module 810, and a comparing module 812.

The request receiving module 806 receives the communication request sent by a client terminal.

In the example embodiment, when the client terminal sends the communication request to the server 800, it indicate that a user logs into the server 800 through the client terminal to view, edit, or use corresponding data stored at the server 800. For example, the user logs into a website through the personal computer, the user uses a bank card to make payment at a merchant, the user uses the bank card to withdraw cash from the ATM or a deposit/withdrawal machine, the user makes payment through an online bank, etc.

For example, the communication request may be a character string composed of characters, which represents that the client terminal requests to establish a communication with the server 800. Based on the communication, the client terminal may visit data stored on the server 800.

The responding module 808 responds to the communication request, generates at least one digit code according to a first preset rule, and sends information including the at least one digit code to the client terminal.

In the example embodiment, the digit code may represent a serial number of a digit of preset data. A ranking order of the digit codes of the preset data may be from left to right or from right to left. For example, if the preset data is "754962" and a ranking order of the digit codes are from left to right, the digit code of the number "7" is 1, the digit code of the number "5" is 2, and the digit codes of the numbers "4," "9," "6," and "2" are 3, 4, 5, and 6 respectively. If the ranking order of the digit codes are from right to left, the digit code of the number "2" is 1, the digit code of the number "6" is 2, and the digit codes of the numbers "9," "4," "5," and "7" are 3, 4, 5, and 6 respectively.

For example, the preset data may be pre-stored in the server 800 to be used as encryption key when the client terminal establishes the communication with the server 800. For instance, when the client terminal inputs the preset data which is same as those in the server 800, the client terminal establishes the communication with the server 800. The preset data may be a password preset by the user. The preset data may be stored corresponding to an account number or a user name of the user. When the user inputs the correct account number and the password or the user name and password, the user has access to data stored at the server 304. For example, the preset data may be a password for the user to log into the website. The user inputs the user name and the password at a login interface of the website to log into the website to conduct further operations. The preset data may be the password of the bank account of the user. The user uses the account number and the password or the account name and the password to conduct business at the bank or the ATM. For example, a number of digits of the preset data may be preset at a fixed number.

For example, the first preset rule is used to generate at least one digit code. A number of the at least one digit code and a value of such number are less than or equal to that of the preset data. The first preset rule generates a number of digits whose quantity or value of such quantity are less than or equal to that of the preset data. For example, a number of digit codes of the preset data is 6. The preset rule is to randomly pick two numbers between 1 and 6 each time and such selected two numbers are used as the digit codes. Certainly, when the communication request is received, the number of the generated at least one digit code may be not limited to two, which may be 1, 3, 4, 5, or 6, as long as the number of the at least one digit code is less than that of the digit codes of the preset data.

The verification data receiving module 810 receives the at least one verification data sent by the client terminal.

In the example embodiment, the verification data is used to determine whether the client terminal has the privilege to visit the data at the server 800.

The comparing module 812 compares digit data in preset data corresponding to at least one digit code with the verification data, and, when the digit data corresponding to the at least one digit code is the same as the verification data, sends a successful information code to the client terminal.

For example, the server 800 compares the digit data corresponding to each digit code with the verification data. When the verification data is the same as the digit data, it indicates that the current user has an authorization to pass identity verification or is authorized to log in. When part or all of the verification data is not the same as the digit data, it indicates that there is error when verifying data, which also indicates that the current user does not have the authorization to pass identity verification, is not authorized to log in, or is not authorized to visit data stored at the server.

For example, the successful information code may be a character or a string of characters which represents that the digit data corresponding to the entire digit codes are the same as the verification data. The client terminal is authorized to further access the data stored at the server. For example, after the user logs into the website through the computer and the computer receives the successful information code from the server, the server prompts a successful log-in message. The user then uses the computer to access the data within the authorization. For another example, when the user logs into the online bank and the client terminal receives the successful information code, the user further conducts payment operation. For another example, when the user tries to withdraw cash from ATM, after the ATM receives the successful information code, the user withdraws cash or conducts other operations through the ATM.

The techniques of the present disclosure use one or more preset rules to request the user to input one or more digit data corresponding to one or more designated digit codes in the preset data during the user identity verification process. The required contents to be input by the user may change each time for user identity verification. Thus, the techniques of the present disclosure ensure the password security of the user and reduce the risk that the password is decrypted.

Persons skilled in the art should understand that, the embodiments of the present disclosure may be provided as a method, a system, or a computer program product. Therefore, the present disclosure may be implemented as a hardware embodiment, a software embodiment, or an embodiment combing software and hardware. Moreover, the present disclosure may be in a form of a computer program product implemented on one or more computer readable media (including, but not limited to, a magnetic disk memory, a CD-ROM, an optical memory, and the like) including computer-executable instructions.

The above descriptions are merely embodiments of the present disclosure, and are not intended to limit the present disclosure. One of ordinary skill in the art understands that the present disclosure may have various modifications and variations. Any modification, equivalent replacement, improvement or the like made with the spirit and principle of the present disclosure should all belong to the scope of claims of the present disclosure.

What is claimed is:

1. A method comprising:
   receiving, by a server, a request including account information of a user of a client terminal;
   generating at least one digit code according to a first preset rule;
   sending the account information including the at least one digit code to the user of the client terminal;

inputting by the user of the client terminal, the at least one digit code to obtain verification data, wherein the verification data is used to determine whether the current user that inputs the at least one digit code has a privilege to visit data stored in the server through the client terminal;

receiving the verification data sent by the user of the client terminal;

obtaining, by the server, at least one digit data corresponding to the at least one digit code from a preset data;

comparing the at least one digit data with the verification data; and sending a successful information code to the user of the client terminal in response to determining that the at least one digit data is the same as the verification data.

2. The method as of claim 1, wherein the preset data is a password of an account.

3. The method of claim 1, wherein a number of the at least one digit code is less than a number of the preset data.

4. The method of claim 1, further comprising setting a digit code of the preset data as a reserved code,
wherein the at least one digit code does not include the reserved code.

5. The method of claim 1, wherein the first preset rule includes a random function that generates a number of the at least one digit codes that is less than a number of the preset data.

6. The method of claim 1, wherein the client terminal is a personal computer, a point of sale (POS) machine, or an automatic teller machine (ATM).

7. The method of claim 1, further comprising:
generating a verification code according to a second preset rule; and
sending the verification code to a preset terminal.

8. The method of claim 7, further comprising:
receiving a to-be-verified code from the client terminal, and
comparing the at least one digit data with the verification data including:
comparing the at least one digit data with the verification data; and
comparing the to-be-verification code with the verification code.

9. The method of claim 8, wherein the sending the successful information code to the client terminal in response to determining that the at least one digit data is the same as the verification data includes:
sending the successful information code to the client terminal in response to determining that the at least one digit data is the same as the verification data and the to-be-verification code is the same as the verification code.

10. The method of claim 1, wherein the preset terminal is a mobile phone.

11. A method comprising:
sending, by a client terminal, a request including account information of a user of the client terminal to a server;
generating at least one digit code according to a preset rule;
receiving the account information sent by the server, the account information including at least one digit code;
generating at least one input box;
inputting, by the user of the client terminal, the at least one digit code into the input box;
detecting an input event of the at least one input box;
obtaining data of the at least one input box when the input event occurs;
using the data of the at least one input box as at least one verification data, wherein the verification data is used to determine whether the current user that inputs the at least on digit code has a privilege to visit data stored in the server through the client terminal; and
sending the at least one verification data to the server.

12. The method of claim 11, further comprising:
obtaining a verification code received by a preset terminal;
using the verification code as a to-be-verified code; and
sending the to-be-verified code to the server.

13. The method of claim 12, wherein the preset terminal is a mobile phone.

14. The method of claim 11, wherein the client terminal is a personal computer, a point of sale (POS) machine, or an automatic teller machine (ATM).

15. A data communication system comprising a server including:
one or more processors; and
a memory including instructions executable by the one or more processors, which when executed perform the following acts:
receiving a request sent by the client terminal, the request including account information of a user of the client terminal;
generating at least one digit code according to a first preset rule in response to the request and sending the account information including the at least one digit code to the user of the client terminal, wherein a user inputs the at least one digit code to obtain verification data, wherein the verification data is used to determine whether the current user that inputs the at least one digit code has a privilege to visit data stored in the server through the client terminal;
receiving the verification data sent by the user of the client terminal;
obtaining at least one digit data corresponding to the at least one digit code from a preset data;
comparing the at least one digit data with the verification data; and
sending successful information code to the user of the client terminal in response to determining that the at least one digit data is the same as the verification data.

16. The data communication system of claim 15, wherein the preset data is a password of an account.

17. The data communication system of claim 15, the system further comprising a client terminal including:
one or more processors; and
a memory including instructions executable by the one or more processors, which when executed perform the following acts:
sending the communication request to the server;
receiving at least one digit code sent by the server;
generating at least one input box;
detecting an input event of the at least one input box, when a user inputs the at least one digit code into the input box;
obtaining data of the at least input box when the input event occurs;
using the data of the at least one input box as at least one verification data; and
sending the at least one verification data to the server.

18. The data communication system of claim 17, wherein the client terminal is a personal computer, a point of sale (POS) machine, or an automatic teller machine (ATM).

* * * * *